United States Patent [19]
Kubista

[11] Patent Number: 5,570,397
[45] Date of Patent: Oct. 29, 1996

[54] REDUNDANT SYNCHRONIZED CLOCK CONTROLLER

[75] Inventor: Thomas T. Kubista, Eagan, Minn.

[73] Assignee: Unisys Corporation, Blue Bell, Pa.

[21] Appl. No.: 173,446

[22] Filed: Dec. 23, 1993

[51] Int. Cl.$^6$ ........................................... H04L 7/00
[52] U.S. Cl. ..................... 375/356; 375/357; 327/144
[58] Field of Search ................................ 327/144, 141,
327/152; 370/103, 105; 375/354, 356, 357,
371, 375, 373, 376; 331/46, 49, 55, 56

[56] References Cited

U.S. PATENT DOCUMENTS

| | | | |
|---|---|---|---|
| 4,216,544 | 8/1980 | Boleda et al. | 375/119 |
| 4,809,302 | 2/1989 | Richman et al. | 375/356 |
| 5,036,528 | 7/1991 | Costantino et al. | 375/119 |
| 5,062,124 | 10/1991 | Hayashi et al. | 375/107 |
| 5,289,138 | 2/1994 | Wang | 375/357 |
| 5,371,764 | 12/1994 | Gillingham et al. | 375/376 |

Primary Examiner—Stephen Chin
Assistant Examiner—Hai H. Phan
Attorney, Agent, or Firm—Charles A. Johnson; Steven P. Skabrat; Mark T. Starr

[57] ABSTRACT

A redundant clock signal generator which allows the use of differing quantities of oscillators, depending on the degree of reliability desired. Synchronizers accompany each oscillator, and phase detectors monitor the phase deviation between any two oscillators in which synchronization is desired. Multiple pairs of oscillators are synchronized to produce a group of simultaneously synchronized clock signals, which are all concurrently available. Selection circuitry selects a predetermined number of the synchronized clock signals at the request of the selection control circuitry. The selection control circuitry determines which of the synchronized clock signals are to be selected either automatically or through manual intervention. Automatic selection can be triggered upon notification to the selection control circuitry of an error condition. The redundant nature of the invention allows redundant circuit loads to be clocked simultaneously, while providing redundancy in the clock signals themselves by selecting a different synchronized clock signal upon the failure of the currently active synchronized clock signal.

18 Claims, 13 Drawing Sheets

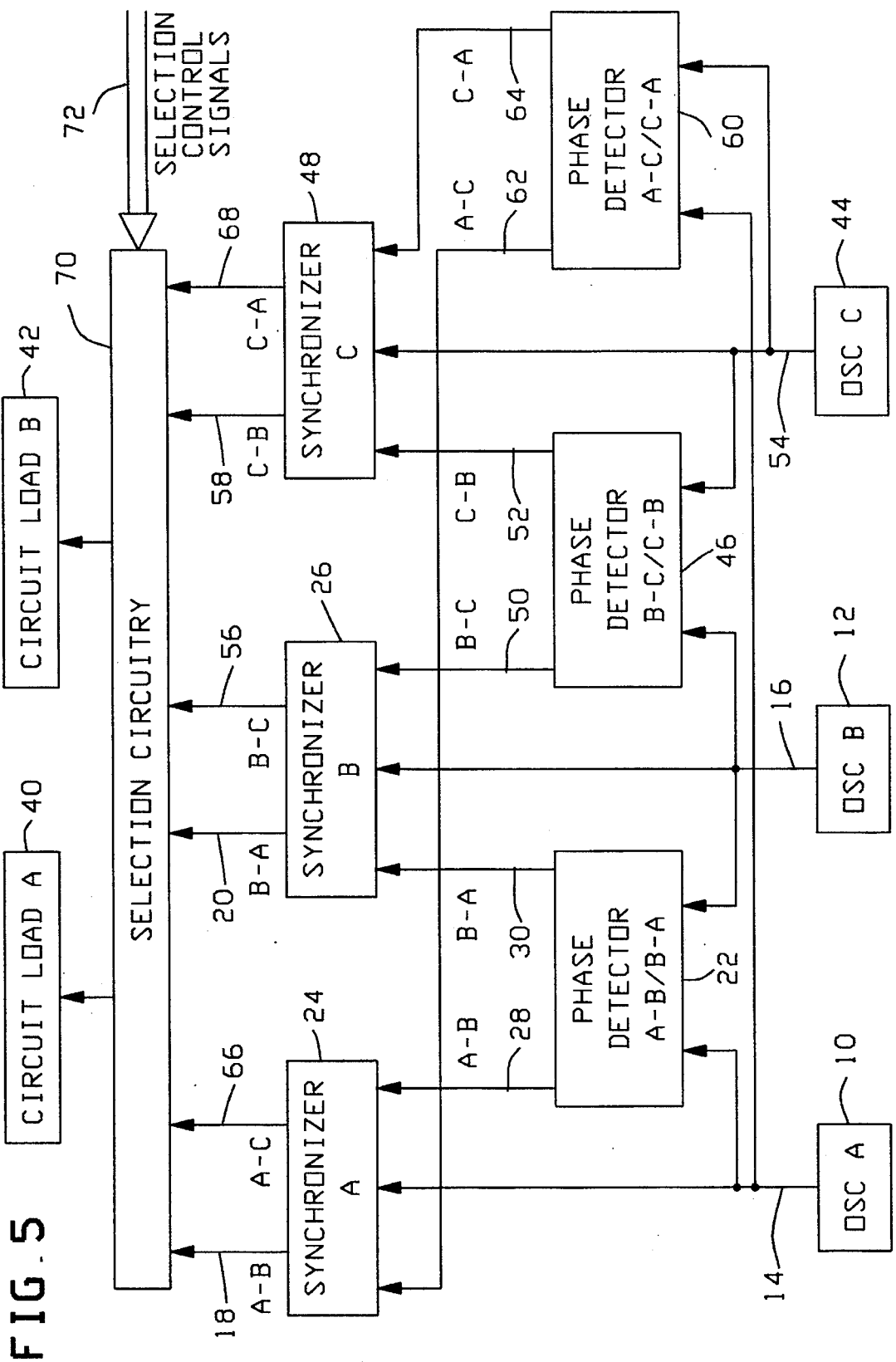

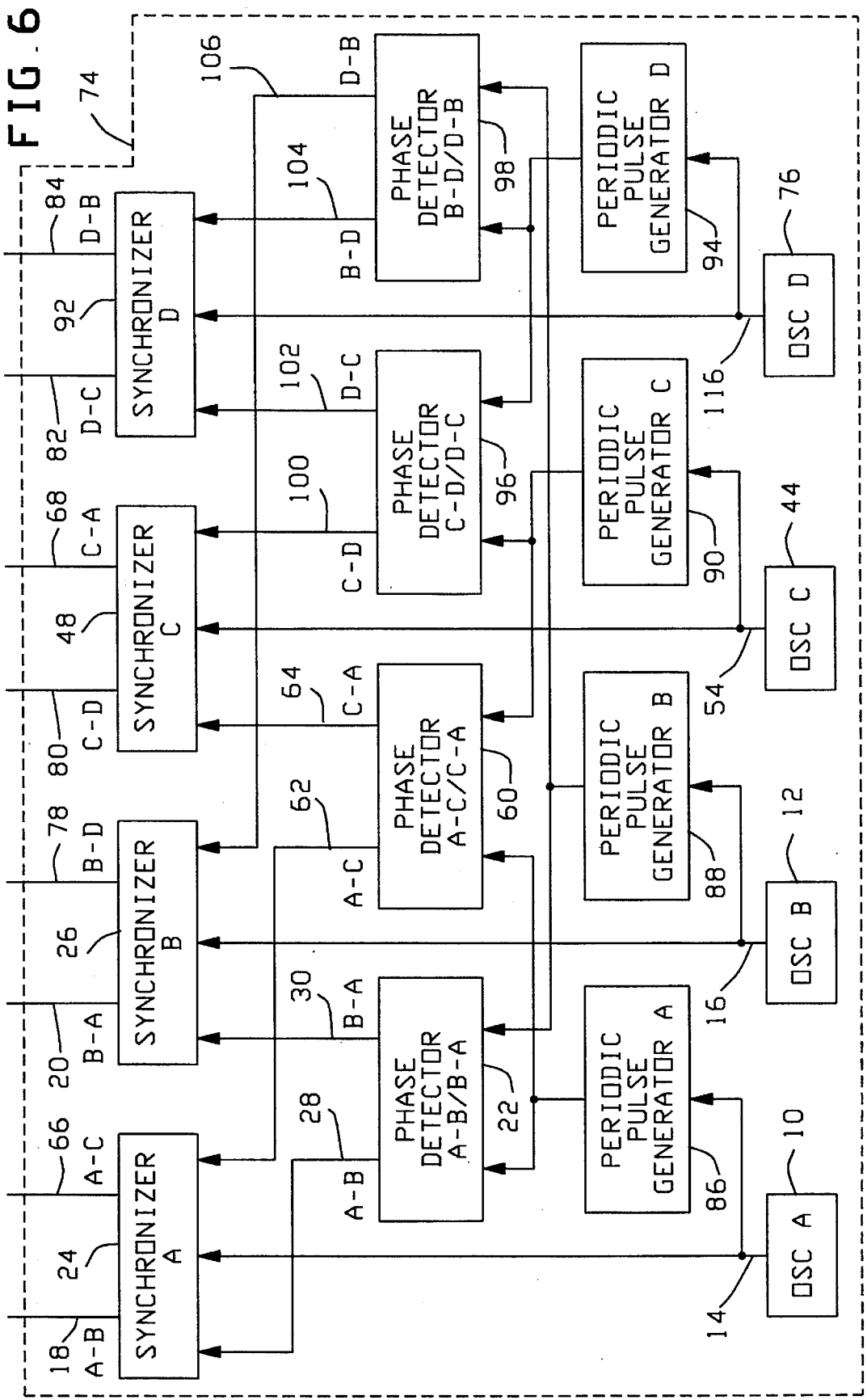

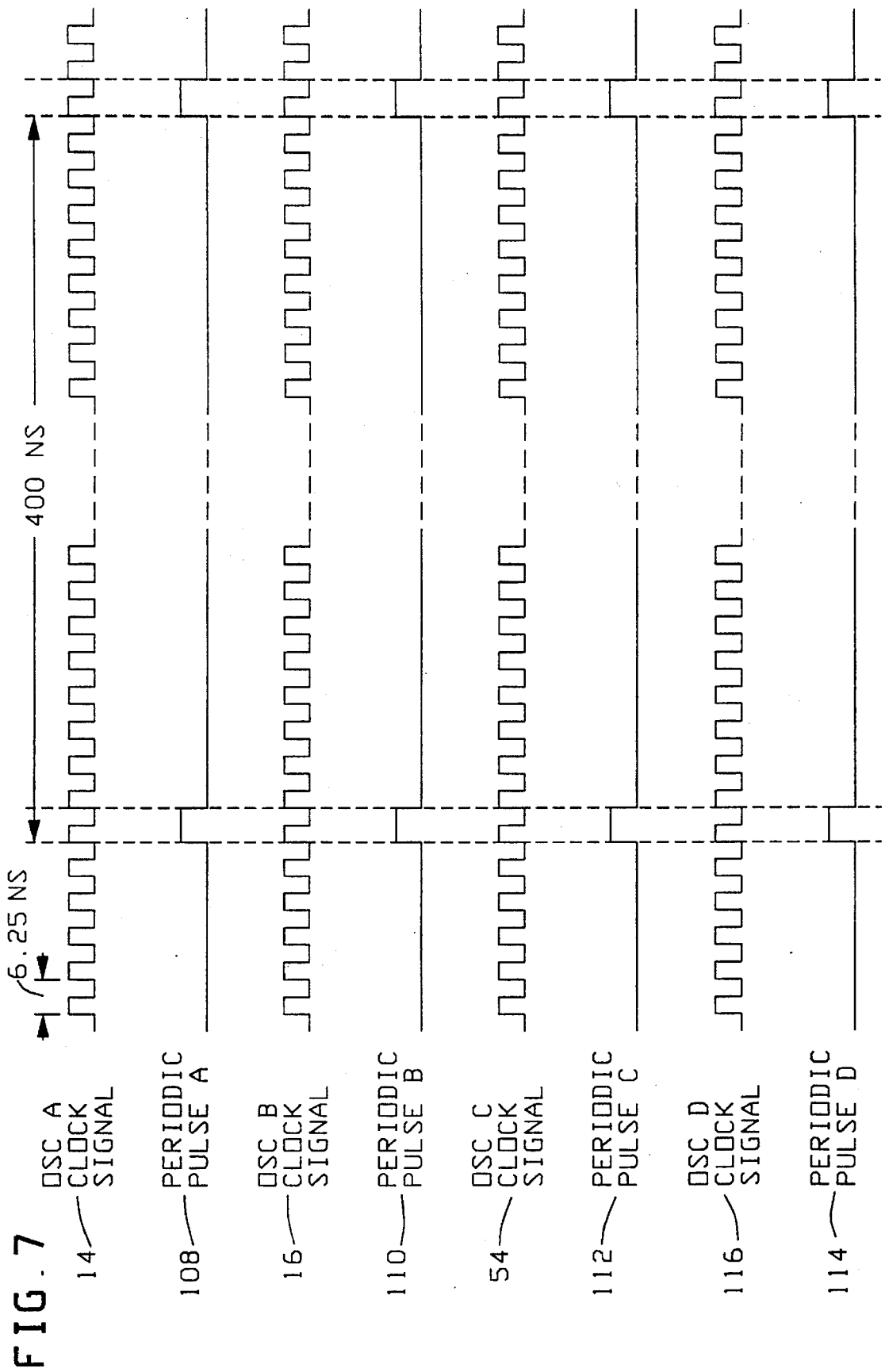

REDUNDANT SYNCHRONIZED CLOCK CONTROLLER

This application is related to copending application Ser. No. 08/172,661, filed Dec. 23, 1993, filed concurrently and commonly assigned with the present invention.

BACKGROUND OF THE INVENTION

1. Field of the Invention

The present invention relates to digital clock synchronization, and more particularly to the simultaneous synchronization of multiple redundant oscillators, and to the control and selection thereof.

2. Description of the Prior Art

Digital systems requiring a digital clock signal can typically be categorized as "asynchronous" or "synchronous" systems. An asynchronous system often does not require simultaneous clocking of its circuitry, but rather use control circuitry or "handshake" lines to control timing, and activity can occur at any time as long as no activity overlap occurs. Asynchronous systems that do utilize simultaneous clock signals do not control the data arrival time at the clocked circuit loads relative to the occurrence of clock pulses. On the other hand, a synchronous system is one where circuitry must be activated at a specific time in relation to a system clock. Synchronous systems are digital systems where the operations are typically controlled by continuous, periodic clock pulses.

In synchronous systems, it is important that activity within a circuit occurs at a particular time in relation to the clock signal. Clock skew, which can be broadly defined as phase differences due to clock path delay variations, can adversely affect the timing of activity within different areas of a circuit. Therefore, eliminating clock skew is an important issue in a synchronous design, since it is important that the driving clock signals occur simultaneously at the clock receiving circuitry in order to minimize the time that logic activity must be suspended to ensure valid clocking. Ideally, the clocking signals would occur at the same instant at all of the logic circuits requiring clock signals.

Eliminating clock skew may not be the only reason to utilize synchronized clock signals. The present invention achieves the synchronization of two independently driven synchronous sub-systems with redundant circuit loads. This invention has the advantage that the clock in either sub-system can fail due to a power failure or the failure of its source oscillators, and the load redundancy will allow the total system to continue operating. To achieve this result, both sub-systems must contain identical data and perform identical functions simultaneously. This invention synchronizes the sub-system source oscillators such that a failure of the coupling mechanism itself will not cause both sub-systems to fail.

Many of the existing clock synchronization circuits address the clock skew problem. It is known to use synchronizing circuits to synchronize a local system clock with a reference clock. Such a circuit is disclosed in U.S. Pat. No. 5,036,528, by Costantino et al., issued Jul. 30, 1991. In the Costantino circuit, a plurality of replicas of a free-running clock are generated, with each replica slightly shifted in phase from one another. An iterative process is then performed, which selects the replica which is closest to being synchronized with the reference clock. This type of synchronization results in a single system clock which is synchronized with a single reference clock. Another such circuit is disclosed in U.S. Pat. No. 4,216,544, by Boleda et al., issued Aug. 5, 1980. This circuit also synchronizes an incoming signal with a reference clock.

The present invention differs from the Costantino and Boleda concepts in that any of a plurality of oscillators may be the system clock itself. In the Costantino design, the reference clock is not used as a system clock, but is only used as a reference to generate another clock. Therefore if either the system clock or the reference clock fail, all synchronization is lost. In the present invention, multiple oscillators are synchronized with each other in pairs. The synchronization is necessary so that each of the synchronized oscillators in a synchronized clock pair can clock independent circuit loads at precisely the same time. Each of these pairs of synchronized clock signals can be independently selected to be the system clock, and if an oscillator fails, another pair of synchronized oscillators can quickly be selected to drive the system. Since synchronization amongst the oscillators themselves is the important factor, no reference clock is needed.

In U.S. Pat. No. 5,062,124, by Hayashi et al., issued Oct. 29, 1991, the design provides a clock to multiple circuit loads in a communications system. A master clock is synchronized with a reference clock, and this master clock is then distributed throughout each of the circuit loads. Although this circuit does provide a synchronized clock to multiple circuit loads, the concept varies considerably from the present invention. The Hayashi invention, like the Costantino and Boleda inventions, is still based on a single driving clock synchronized with a single reference clock. The present invention does not rely on the operation of any single oscillator. Any of the redundant oscillators may be synchronized with any of the other redundant oscillators to provide synchronized clock signals to the recipient circuitry.

One practical application of the present invention is to simultaneously clock two redundant circuit loads. This design will provide two synchronized clock signals, one to each of the circuit loads. Since the two clock signals are synchronized with each other, both circuit loads will be clocked at the same time. If one or both of the clock signals which are clocking the circuit loads were to fail, a redundant oscillator or even a redundant pair of oscillators can be quickly selected to continue to simultaneously clock the circuit loads. This results in a very efficient fault tolerant synchronization system. This will solve problems of total system failure upon the loss of a driving oscillator, or even upon loss of multiple oscillators.

An important aspect of the present invention is the simultaneous synchronization of a predetermined number of pairs of oscillators. Rather than wait until an oscillator has failed to select and synchronize a new oscillator to drive the circuit loads, the present invention constantly synchronizes a predetermined number of oscillator pairs. This provides a plurality of pre-synchronized clock pairs which can be automatically (or manually) selected very quickly upon an oscillator failure in order to maintain a continuous clock signal at the circuit loads.

OBJECTS

It is a primary objective of this invention to provide an improved redundant clock signal generator and controller.

Another object of the invention is to improve clock signal reliability such that a system requiring digital clock signals will continue to function properly upon the loss of multiple oscillators or associated synchronization circuitry.

Still another object is to simultaneously synchronize multiple pairs of clock signals, so that upon the failure of an oscillator or associated synchronization circuitry, only the selection of an operational synchronized clock signal is required, rather than selecting a new oscillator, synchronizing the new clock signals, and then selecting the synchronized clock signal.

A further object of the invention is to swiftly recover from a faulty oscillator by having all clock signals synchronized and available for use prior to a failure.

Still another object is to allow for varying levels of redundancy by setting the number of oscillators, phase detectors and synchronizers commensurate with the desired level of fault tolerance.

Another object of the invention is to provide a plurality of synchronized clock signals so that an equal number of circuit loads can be simultaneously clocked.

Yet another object of the invention is to allow manually initiated or automatic synchronized clock signal selection.

Other more detailed objectives will become apparent from a consideration of the Drawings and the Detailed Description of the Preferred Embodiment.

SUMMARY OF THE INVENTION

The invention is an improved redundant clock signal generator for use in a system which requires multiple synchronized clock signals to simultaneously clock multiple redundant circuit loads, or in a system in which one or more circuit loads are each clocked by redundant clock signals to maintain functionality in the event that other clock signals fail. In accordance with one aspect of the invention, the apparatus utilizes multiple like-frequency oscillators, each of which outputs a clock signal. The oscillators are monitored in pairs by digital phase detectors. Each possible combination of two oscillators is monitored by a phase detector to determine the phase deviation between these two oscillators. Two resynchronization requests are outputted from each phase detector, and each resynchronization request is connected to a digital synchronizer. The two synchronizers that are connected to these resynchronization requests are those that adjust the phase of the clock signals that the phase detector is monitoring. Each synchronizer will output a phase-adjusted clock signal for each of the clock signals that was synchronized with it's associated oscillator; i.e., if the synchronizer's associated oscillator is being synchronized with three other oscillators, the synchronizer will output three phase-adjusted clock signals—one for each pair of oscillators synchronized. Therefore, multiple phase-adjusted clock signals at the output terminals of all of the synchronizers, equal to the number of total possible number of combinations of two clock signals, are simultaneously available to concurrently clock redundant circuit loads, or to provide redundant synchronized clock signals to a given number of circuit loads. These phase-adjusted clock signals are referred to as synchronized clock signals, since the phase was adjusted in order to synchronize it with another clock signal.

It is also possible to synchronize combinations of two oscillators fewer than the total possible number of combinations which can be achieved with a given number of oscillators. It may be the case that only four synchronized clock signals are required to obtain the desired redundancy, and four oscillators are used. Although four oscillators could provide for a maximum of six synchronized clock pairs, only four pairs of oscillators would have to be synchronized. This can be accomplished by reducing the number of phase detectors to four, while keeping the same fundamental architecture.

An additional aspect of the invention is the use of selection circuitry and selection control circuitry. These circuits allow a synchronized clock signal or a number of synchronized clock signals to be chosen to drive the circuit load(s). Therefore, when a synchronized clock signal fails, an operational synchronized clock signal can be selected to drive the load(s).

The synchronized clock signals which are outputted from the synchronizers are inputted into the selection circuitry. This circuitry will physically select which one or more of the synchronized clock signals as a driving clock signal to a circuit load or to multiple circuit loads. The selection control circuitry is connected to the selection circuitry, and determines which of the synchronized clock signals should be selected by the selection circuitry. The selection control circuitry will determine which synchronized clock signals to choose by way of automatic or manual intervention through its selector input terminals. It will automatically select predetermined synchronized clock signals upon the failure of the active synchronized clock signals. It will also select synchronized clock signals as specified by a user through a user interface. A decoding circuit is used to convert this selection information into individual logic signals to notify the selection circuitry of which synchronized clock signals to select. It was an object of this invention to select two synchronized clock signals at a time, these two signals originating from two oscillators that have been synchronized to each other. Therefore, the decoding circuitry will make a selection as to which single pair of synchronized clock signals the selection circuitry should select, and this signal is divided by hardware into two logic signals to notify the selection circuitry to select both of the synchronized clock signals.

A more specific aspect of the invention entails the use of only two oscillators, one phase detector, and two synchronizers. Each oscillator is connected to one synchronizer, and the phase detector monitors the phase deviation between the two oscillators. Upon determining an unacceptable phase deviation, the phase detector will notify the synchronizer associated with the deviating oscillator to resynchronize with the other oscillator. Two synchronized clock signals are produced which can simultaneously synchronize two circuit loads which must be clocked at the same time. This embodiment of the invention differs from the multiple oscillator embodiment in that no selection circuitry or selection control circuitry is required. This is a result of there being only two synchronized clock signals, and one clocks one circuit load and the other clocks the remaining circuit load. This embodiment forgoes the selectability of redundant clock signals in exchange for simplicity of design. Redundancy still exists however, since the failure of one oscillator or associated circuitry will result in the discontinued operation of only one of the two circuit loads. The remaining circuit load, driven by the remaining oscillator, can continue normal operations.

Still other objects and advantages of the present invention will become readily apparent to those skilled in this art from the following detailed description, where the preferred embodiment of the invention is shown by way of illustration of the best mode contemplated of carrying out the invention. As will be realized, the invention is capable of other and different embodiments, and its details are capable of modification without departing from the invention. Accordingly, the drawing and description are to be regarded as illustrative in nature, and not as restrictive.

BRIEF DESCRIPTION OF THE DRAWINGS

FIG. 5 is a diagram showing the utility of the present invention in clocking redundant circuit loads;

FIG. 6 is a diagram showing the number of oscillators, phase detectors, and synchronizers used in the preferred embodiment;

FIG. 7 is a waveform diagram showing the periodic pulse relationship to the clock signals;

DETAILED DESCRIPTION OF THE PREFERRED EMBODIMENT

Figure 1:
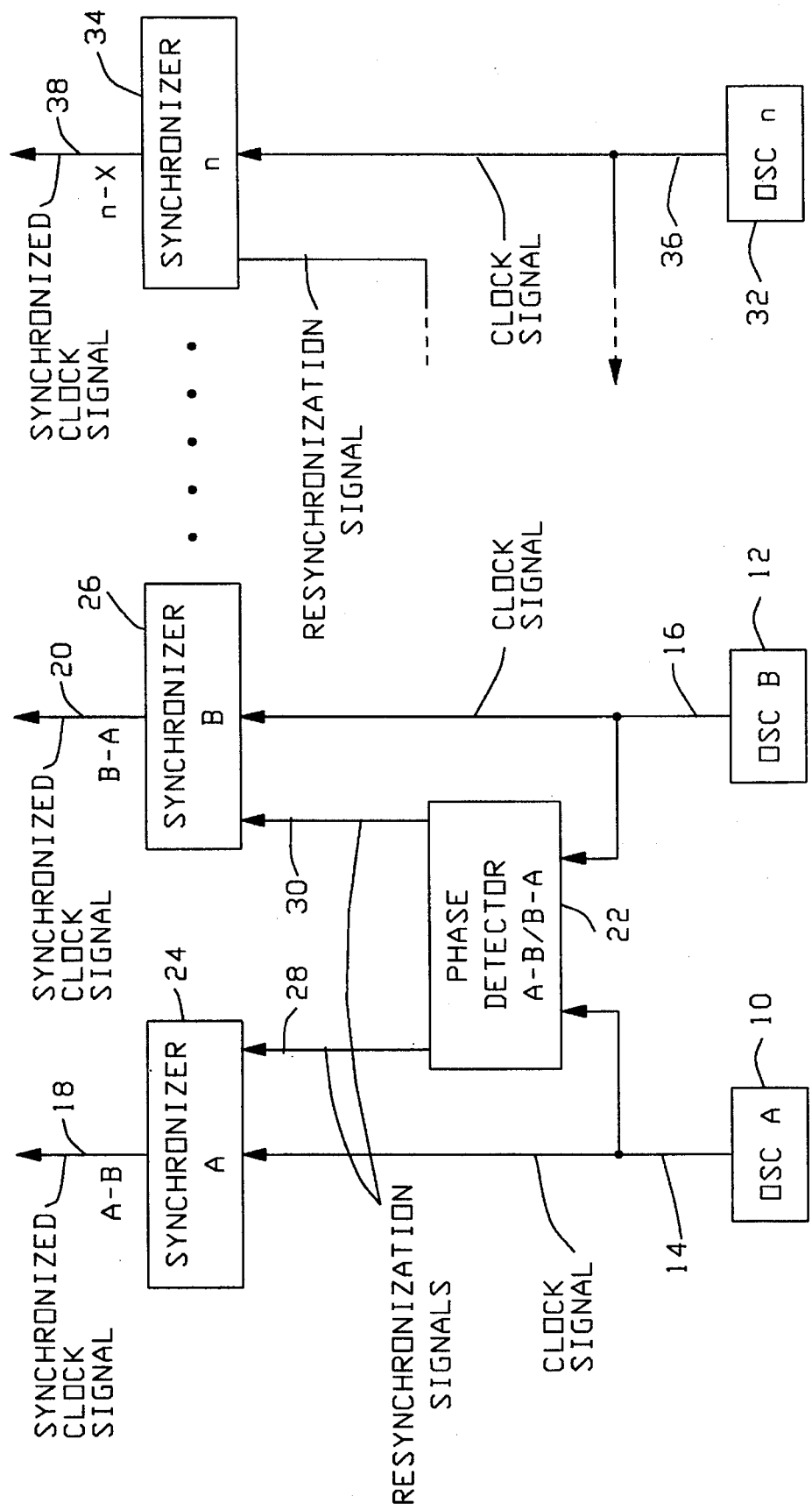
FIG. 1 is a block diagram of the general synchronization concept and the capability to include additional oscillators and synchronization circuitry.

FIG. 1 is a block diagram of the general synchronization concept and the capability to include additional oscillators and synchronization circuitry. This invention allows as many oscillators as desired to be simultaneously synchronized with each other, in order to produce a set of synchronized clock signals. A clock signal is the signal produced by an oscillator, and a synchronized clock signal is a clock signal which has been synchronized with another clock signal. If any one of the oscillators or it's associated circuitry were to fail, other operational synchronized clock signals would still be available within this set of synchronized clock signals so that the circuitry utilizing the synchronized clock signals can remain operational. The present invention could be used to simultaneously synchronize as few as two clock signals, or as many as desired. Two oscillators, labelled OSC A 10 and OSC B 12, can have their clock signals, the OSC A Clock Signal 14 and the OSC B Clock Signal 16 respectively, synchronized with each other to produce two Synchronized Clock Signals A-B 18 and B-A 20. In this example, Synchronized Clock Signal A-B consists of the OSC A Clock Signal which has been synchronized with the OSC B Clock Signal. Similarly, Synchronized Clock Signal B-A consists of the OSC B Clock Signal which has been synchronized with the OSC A Clock Signal. Phase Detector A-B/B-A 22 works in conjunction with Synchronizer A 24 and Synchronizer B 26 to keep the OSC A Clock Signal and the OSC B Clock Signal synchronized with each other. Phase Detector A-B/B-A issues Resynchronization Request A-B 28 and Resynchronization Request B-A 30 to indicate to the Synchronizers to resynchronize it's associated clock signal with the other clock signal. More detail on the operation of the Phase Detector and Synchronizers follows in a later section of this description.

Also shown in FIG. 1 is another oscillator, labelled OSC n 32, and another synchronizer, labelled Synchronizer n 34. Connecting OSC n and Synchronizer n is OSC n Clock Signal 36. Synchronized Clock Signal n-X 38 consists of the OSC n Clock Signal which has been synchronized with another chosen clock signal, OSC X Clock Signal, which is derived from OSC X. (not shown, as OSC X could be any of the oscillators). Therefore, for each new oscillator which is added to the system, it's clock signal can be synchronized with any or all of the preexisting clock signals by adding a phase detector and the appropriate connections for each oscillator for which synchronization is desired. A detailed description of how additional oscillators may be added is shown in FIG. 2 through FIG. 4.

Figure 2:
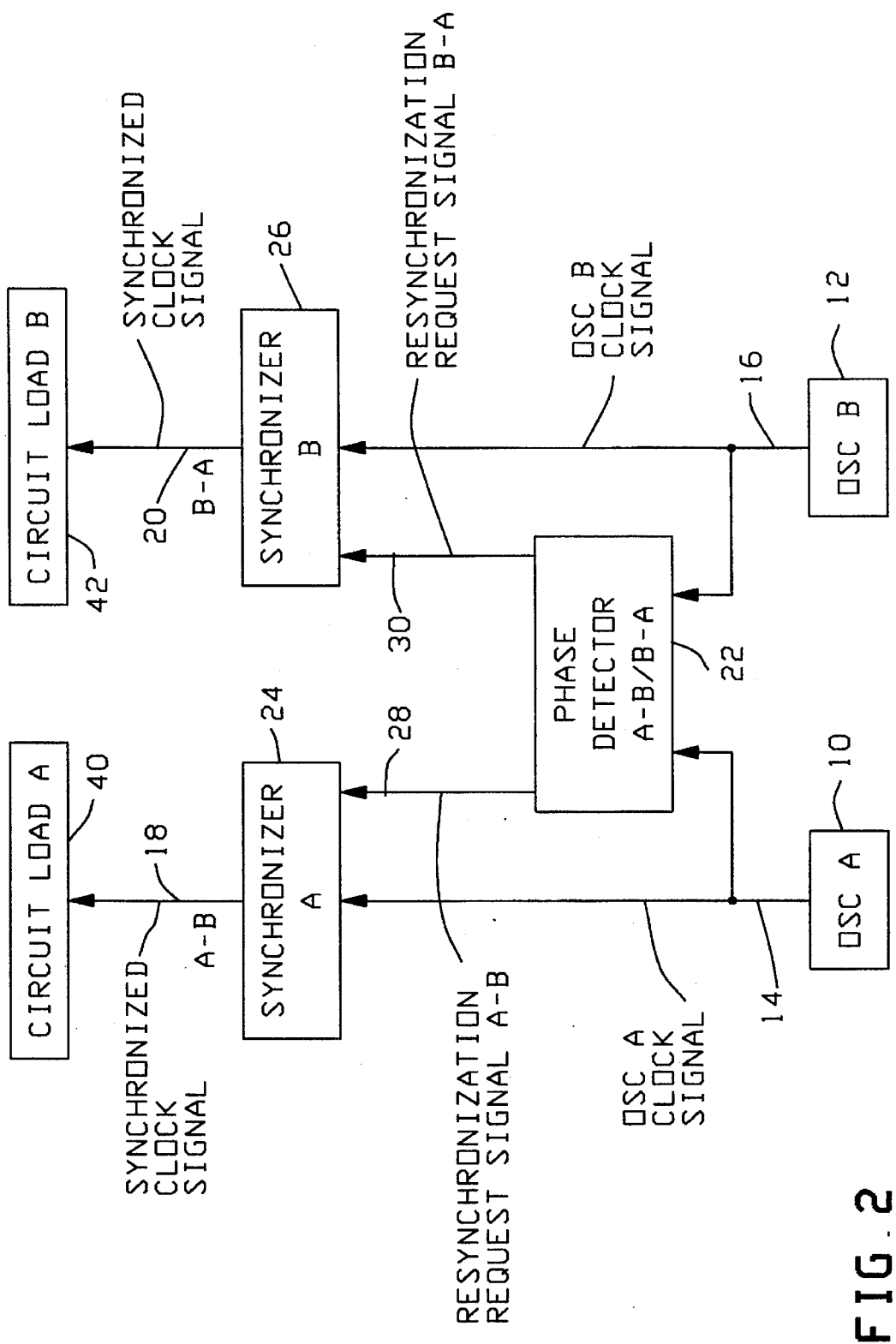
FIG. 2 is a block diagram of the invention in its most basic form, consisting of two simultaneously synchronized clock signals.

FIG. 2 is a block diagram of the invention in its most basic form, consisting of two simultaneously synchronized clock signals. As earlier described, OSC A 10 and OSC B 12 generate the OSC A Clock Signal 14 and the OSC B Clock Signal 16 which are monitored by Phase Detector A-B/B-A 22 in order to determine whether they are in phase with one another. If the clock signals are not synchronized, Phase Detector A-B/B-A will send Resynchronization Request A-B 28 or Resynchronization Request B-A 30 to Synchronizer A 24 or Synchronizer B 26 respectively, to inform that synchronizer to resynchronize its clock signal with the other. The synchronizer which receives this resynchronization request signal will be the synchronizer which is associated with the clock signal that is "leading" the other. The result of this synchronization is that two synchronized clock signals will be present at the outputs of the synchronizers. Here, Synchronized Clock Signal A-B 18 is available, which is the OSC A Clock Signal 14 synchronized with the OSC B Clock Signal 16. Similarly, Synchronized Clock Signal B-A 20 is produced by Synchronizer B 26. These Synchronized Clock Signals could be used to simultaneously clock two redundant circuit loads such as Circuit Load A 40 and Circuit Load B 42, as is done in the preferred embodiment.

The configuration shown in FIG. 2 provides fault tolerance where one of the two oscillators (or any connecting circuitry) fails. If one of the two oscillators fails, the other oscillator will continue to provide a valid clock signal. The benefit provided by creating multiple synchronized clock signals from multiple oscillators will become more apparent in the following diagrams.

Figure 3:
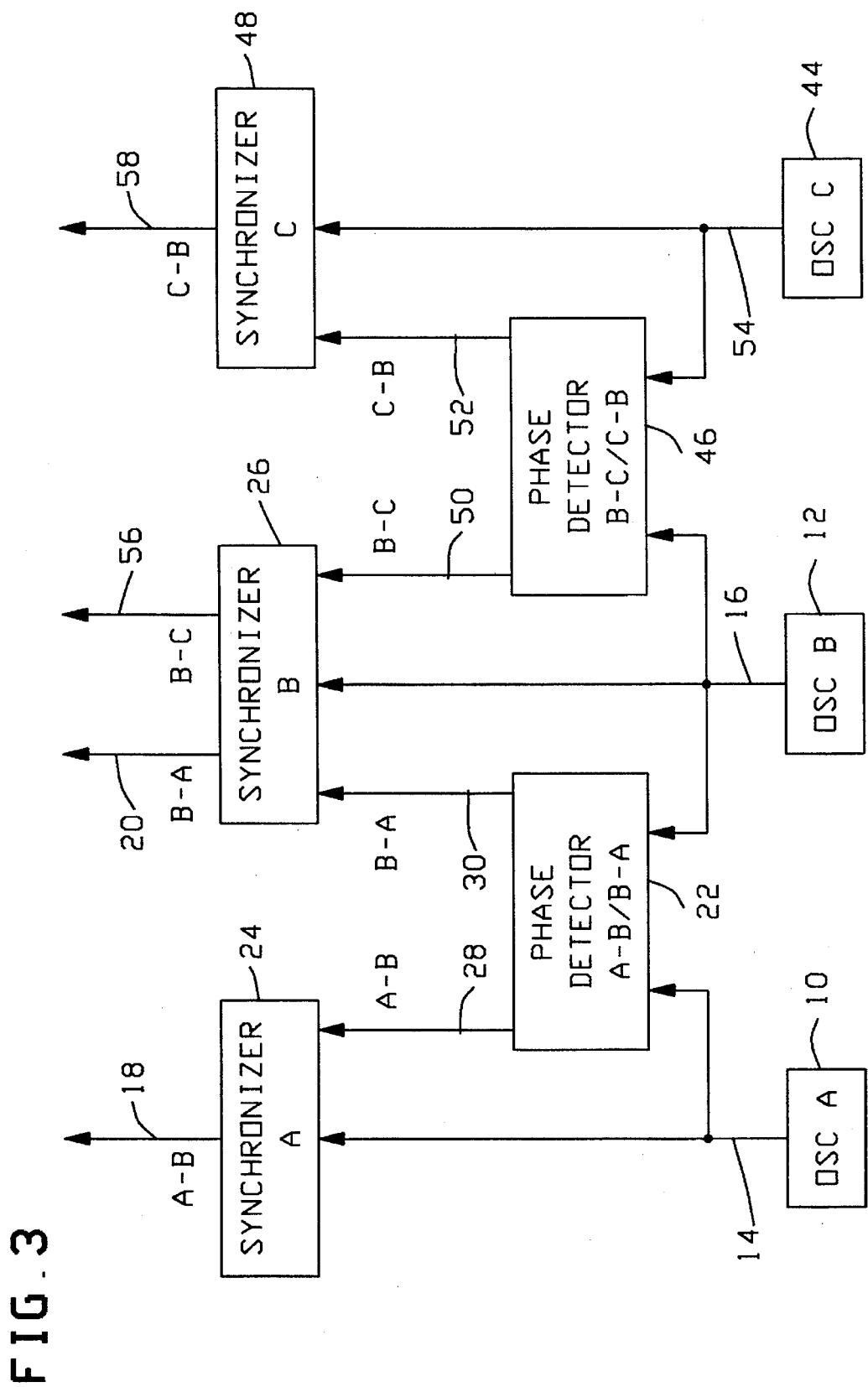
FIG. 3 is a block diagram of the invention where a third oscillator to be synchronized to one other oscillator has been added.
Figure 4:
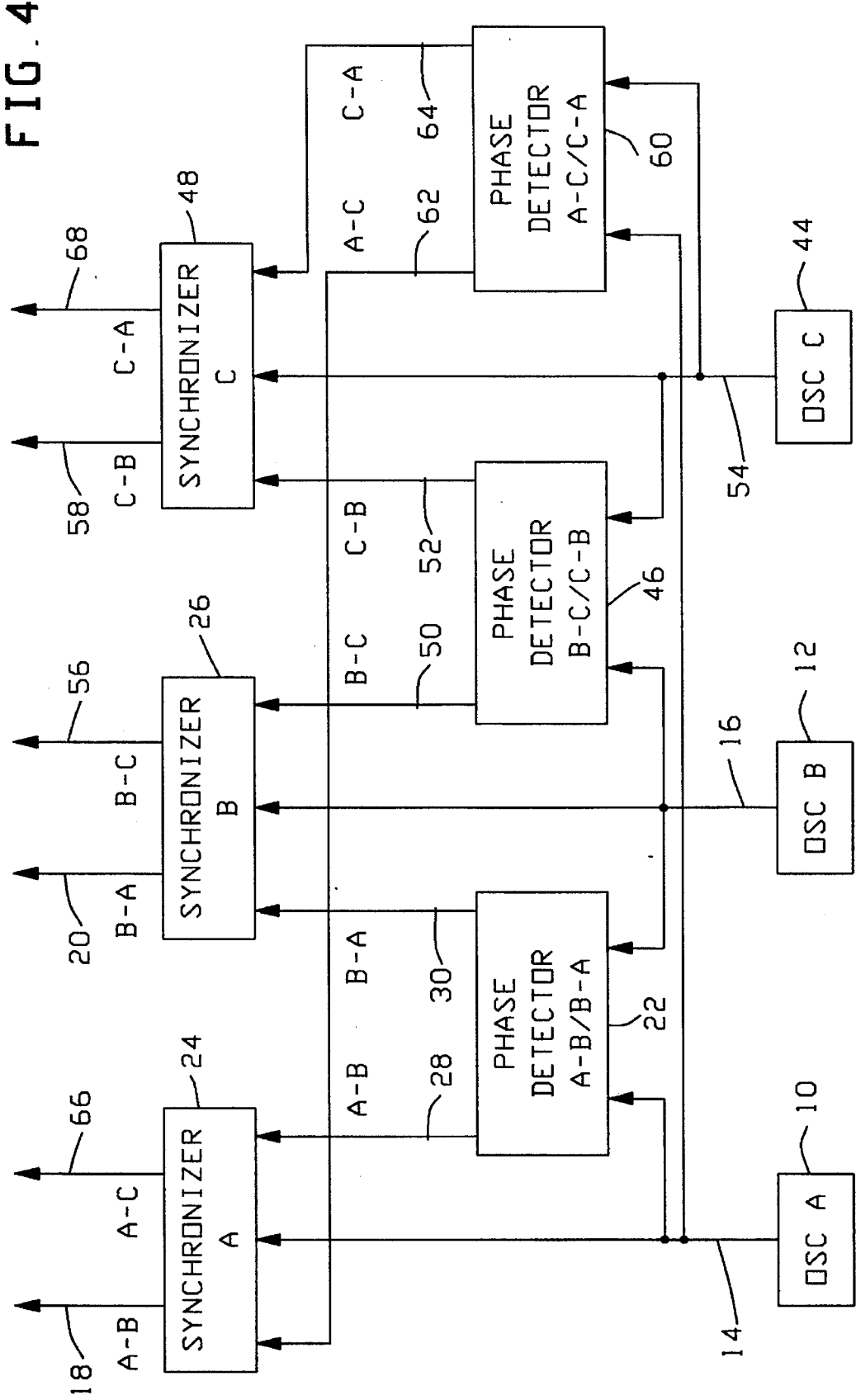
FIG. 4 is a block diagram of the invention where the third oscillator's clock signal is to be synchronized to all of the other oscillator's clock signals.

FIG. 3 is a block diagram of the invention where a third oscillator to be synchronized to one other oscillator has been added. OSC C 44 is the third oscillator, which will be synchronized with OSC B 12. Therefore, another phase detector, labelled Phase Detector B-C/C-B 46, and another synchronizer, labelled Synchronizer C 48 are required. Additional Resynchronization Requests B-C 50 and C-B 52 are also required. It can be seen that the OSC B Clock Signal 16 is now being synchronized with two other clock signals: the OSC A Clock Signal 14 and the OSC C Clock Signal 54. The OSC C Clock Signal is the clock signal generated by OSC C 44. Synchronizer B 26 must then have the capability to independently synchronize the clock signals of OSC B to the clock signals of OSC A and OSC C. Synchronized Clock Signals B-A 20 and B-C 56 are provided at the output of Synchronizer B, while Synchronizer A 24 and Synchronizer C 48 provide Synchronized Clock Signal A-B 18 and Synchronized Clock Signal C-B 58 respectively. The value of adding a third oscillator and associated synchronization circuitry is evident where either OSC A or OSC C fails, since two Synchronized Clock Signals would still be present. For example, if OSC A was to fail, Synchronized Clock Signal B-C 56 and Synchronized Clock Signal C-B 58 would still be available. However, if OSC B was to fail, only the OSC A Clock Signal 14 which had passed through Synchronizer A 24, and the OSC C Clock Signal 54 which had passed through Synchronizer C 48 would be present, and these two signals would not be synchronized with each other. The present invention takes the simultaneous synchronization of clock signals one step further by providing phase detection and synchronization for each set of two oscillators as shown in FIG. 4.

FIG. 4 is a block diagram of the invention where the third oscillator's clock signal is to be synchronized to all of the other oscillator's clock signals. This configuration is similar to the configuration of FIG. 3, except that the added clock signal, the OSC C Clock Signal 54, is synchronized with all of the existing clock signals rather than just one of the existing clock signals. In this configuration, another phase detector, Phase Detector A-C/C-A 60, must be included to monitor the phase deviation between the OSC C Clock Signal 54 and the only other clock signal available to be synchronized with, which is the OSC A Clock Signal 14. Accordingly, two additional Resynchronization Requests A-C 62 and C-A 64 are provided to indicate to Synchronizer A 24 or Synchronizer B 26 to resynchronize it's clock signal with the other. This provides total fault tolerance if any one of the oscillators was to fail. For instance, if OSC B 12 was to fail, the clock signals of OSC A 10 and OSC C 44 will still be synchronized with each other, and two Synchronized Clock Signals will be available: Synchronized Clock Signal A-C 66, and Synchronized Clock Signal C-A 68. The advantage of this configuration over that of FIG. 3 is that two Synchronized Clock Signals will be available regardless of which oscillator might fail.

It can be seen that additional oscillators may continue to be added, along with associated phase detectors and synchronizers, in order to generate a larger set of Synchronized Clock Signals to choose from. For instance, the preferred embodiment of the present invention utilizes four oscillators, in which four pairs of clock signals are simultaneously synchronized. The advantages of having multiple Synchronized Clock Signals are numerous, but a major advantage is that it works particularly well where multiple circuit loads must be simultaneously clocked. If two redundant circuit loads were necessary in a system so that the failure of one circuit load would not render the entire system inoperable, the present invention would ensure synchronized clock signals to each circuit load so that each circuit load would have contained exactly the same data, or had performed exactly the same functions prior to the failure.

The present invention not only provides these necessary synchronized clock signals to redundant circuit loads, but it also comes with its own redundancy, so that an oscillator failure does not cause the circuit loads to stop operating. In the preferred embodiment, two synchronized clock signals will still be available upon loss of an oscillator (or upon loss of two oscillators in some instances). This redundancy of oscillators and associated synchronization circuitry can be important even where only one circuit load is being clocked, if that circuit load has the ability to input redundant clock inputs. In this way, a single circuit load could continue operating upon the loss of one or more oscillators or associated synchronization circuitry. It should be noted that the present invention will work for any type of digital oscillating source, whether it be a digital oscillator, digital clock generating device, etc.

FIG. 5 is a diagram showing the utility of the present invention in clocking redundant circuit loads. Circuit Load A 40 and Circuit Load B 42 represent redundant circuit loads which are to be clocked in a system. Since they are redundant, they must be clocked at the same time so that the failure of one of the Circuit Loads does not result in a loss of functionality or data. It is further desirable to prevent loss of functionality or data in the circuit loads by providing redundant synchronized clock signals to the loads, which is what the present invention will do. The purpose of providing multiple Synchronized Clock Signals can now be seen. If any oscillator or its associated circuitry fails, other operational Synchronized Clock Signals will be readily available to be selected by the Selection Circuitry 70 to supply the Circuit Loads A 40 and B 42 with synchronized clock signals. The selection circuitry can comprise any selection circuitry known in the art, such as multiplexers. The Selection Circuitry 70 will select one pair of the Synchronized Clock Signals to clock the Circuit Loads, through the Selection Control Signals 72. The selection used in the preferred embodiment chooses one oscillator to clock one Circuit Load, and another oscillator to clock the other Circuit Load. For example, the Selection Circuitry may select Synchronized Clock Signal A-B 18 to clock Circuit Load A 40, which is the OSC A Clock Signal 14 synchronized with the OSC B Clock Signal 16. Circuit Load B 42 would then be clocked by Synchronized Clock Signal B-A 20, which is the OSC B Clock Signal synchronized with the OSC A Clock Signal. By choosing the Synchronized Clock Signals which are associated with each other (i.e., Synchronized Clock Signals A-B 18 and B-A 20), two oscillators are responsible for providing synchronized clock signals to the Circuit Loads at a given time. These associated Synchronized Clock Signals are hereafter referred to as "clock pairs". Selecting clock pairs as the driving synchronized clock signals provides the greatest protection against synchronization problems, since one phase detector will be monitoring the two clock signals, and therefore the two Synchronized Clock Signals chosen are synchronized to each other.

FIG. 6 is a diagram showing the number of oscillators, phase detectors, and synchronizers used in the preferred embodiment. This circuitry, the Simultaneous Synchronization Circuitry 74, is responsible for synchronizing the desired number of pairs of clock signals. Four oscillators, labelled OSC A 10, OSC B 12, OSC C 44, and OSC D 76, are used in the preferred embodiment for redundancy purposes. This embodiment will produce four sets of synchronized clock pairs, which comprises eight Synchronized Clock Signals: A-B 18, A-C 66, B-A 20, B-D 78, C-D 80, C-A 68, D-C 82, D-B 84. Up to twelve Synchronized Clock Signals could have been generated with four oscillators, but were not in the preferred embodiment for reasons discussed in the description of FIG. 8.

As seen in FIG. 6, each oscillator is connected to a synchronizer, and a pulse generator which in turn is connected to two phase detectors. OSC A 10 is connected to Synchronizer A 24 and Periodic Pulse Generator A 86. OSC B 12 is connected to Synchronizer B 26 and Periodic Pulse Generator B 88. OSC C 44 is connected to Synchronizer C 48 and Periodic Pulse Generator C 90. OSC D 76 is connected to Synchronizer D 92 and Periodic Pulse Generator D 94. The Periodic Pulse Generators are used to generate a pulse approximately every 400 nanoseconds, and are derived from the clock signals. These pulses then become the input signals which the phase detectors monitor. Phase Detectors A-B/B-A 22, A-C/C-A 60, C-D/D-C 96, and B-D/D-B 98 monitor these pulses for synchronization rather than the clock signals themselves simply because they are derivations of the clock signals which can be monitored more easily than the fast clock signals. Any set-up or hold times in the phase detector circuitry could limit the speed of the oscillator that the phase detector is capable of monitoring if the actual clock signal was used. Since the pulses are derived from the clock signals of each oscillator, monitoring the pulses will detect a phase deviation of the clock signals just as if the clock signals were monitored themselves. Periodic Pulse Generators would not necessarily be required where the phase detector circuitry is fast enough to adequately monitor the particular oscillator speed chosen.

The Phase Detectors A-B/B-A 22, A-C/C-A 60, C-D/D-C 96, and B-D/D-B 98 determine whether its two monitored clock signals are out of phase from one another. Each phase detector is then connected to each of the synchronizers that is associated with the clock signal it is monitoring. These connections comprise Resynchronization Requests. Phase Detector A-B/B-A 22 is connected to Synchronizer A 24 and B 26 through Resynchronization Requests A-B 28 and B-A 30 respectively. Phase Detector A-C/C-A 60 is connected to Synchronizer A 24 and C 48 through Resynchronization Requests A-C 62 and C-A 64 respectively. Phase Detector C-D/D-C 96 is connected to Synchronizer C 48 and D 92 through Resynchronization Requests C-D 100 and D-C 102 respectively. Finally, Phase Detector B-D/D-B 98 is connected to Synchronizer B 26 and D 92 through Resynchronization Requests B-D 104 and D-B 106 respectively. If a phase detector determines that the clock signals are out of phase from one another, a resynchronization request is sent to the synchronizer associated with the clock signal that is leading the other. This resynchronization request triggers that synchronizer to manipulate the leading clock signal by delaying it for a small period of time. This time delay is approximately equal to the phase offset which must be present to trigger the phase detector to send a request to the respective synchronizer. For example, if OSC A 10 in FIG. 6 is producing an OSC A Clock Signal 14 which is slightly faster than the OSC B Clock Signal 16 produced by OSC B 12, the OSC A Clock Signal will begin to lead the OSC B Clock Signal by a small amount. When the time differential between the two signals deviates by a predetermined amount, Phase Detector A-B/B-A 22 will send a Resynchronization Request A-B 28 to Synchronizer A 24 to delay for a short time so that OSC B can "catch up" with OSC A. The output of Synchronizer A is Synchronized Clock Signal A-B 18, which means the OSC A Clock Signal 14 synchronized with the OSC B Clock Signal 16. Similarly, if the OSC B Clock Signal is leading the OSC A Clock Signal, Phase Detector A-B/B-A 22 will send a delay request to Synchronizer B 26 so that OSC A can catch up with OSC B. The synchronizer can delay the leading clock signal by any method of delay known in the art, and signal delays can be accomplished by one skilled in the art.

FIG. 7 is a waveform diagram showing the periodic pulse relationship to the clock signals. Each pulse, Periodic Pulse A 108, Periodic Pulse B 110, Periodic Pulse C 112, and Periodic Pulse D 114, is designed to occur at the same time in relation to specific pulses on the OSC A Clock Signal 14, OSC B Clock Signal 16, OSC C Clock Signal 54, and the OSC D Clock Signal 116 respectively. As can be seen in FIG. 7, a phase deviation can be determined using the Periodic Pulses by monitoring their phase deviation from one another.

Figures 8, 8A:
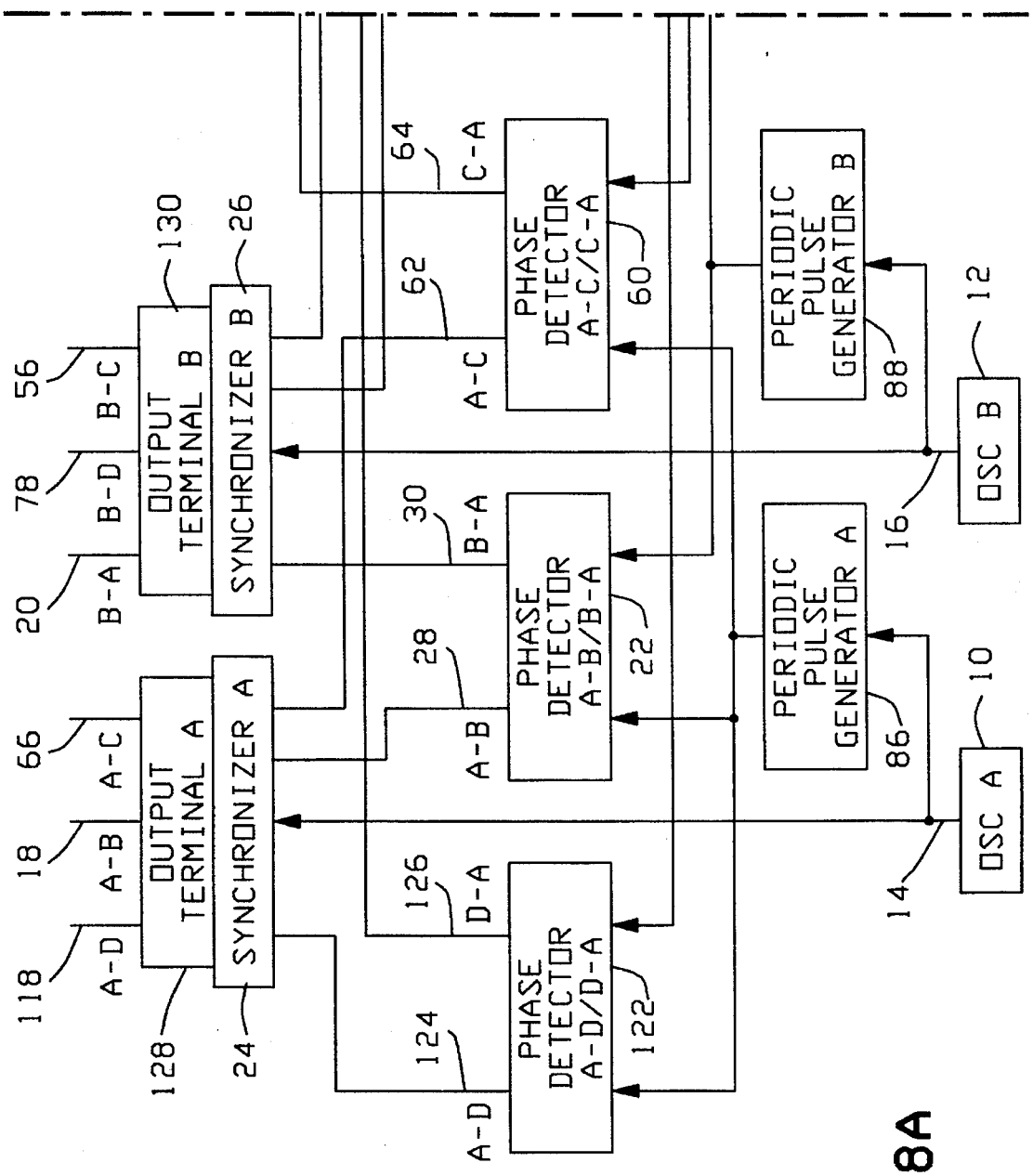
FIG. 8A and FIG. 8B when arranged as shown in FIG. 8, show the capability of a four oscillator design to be expanded from eight Synchronized Clock Signals to twelve Synchronized Clock Signals.
Figure 8B:
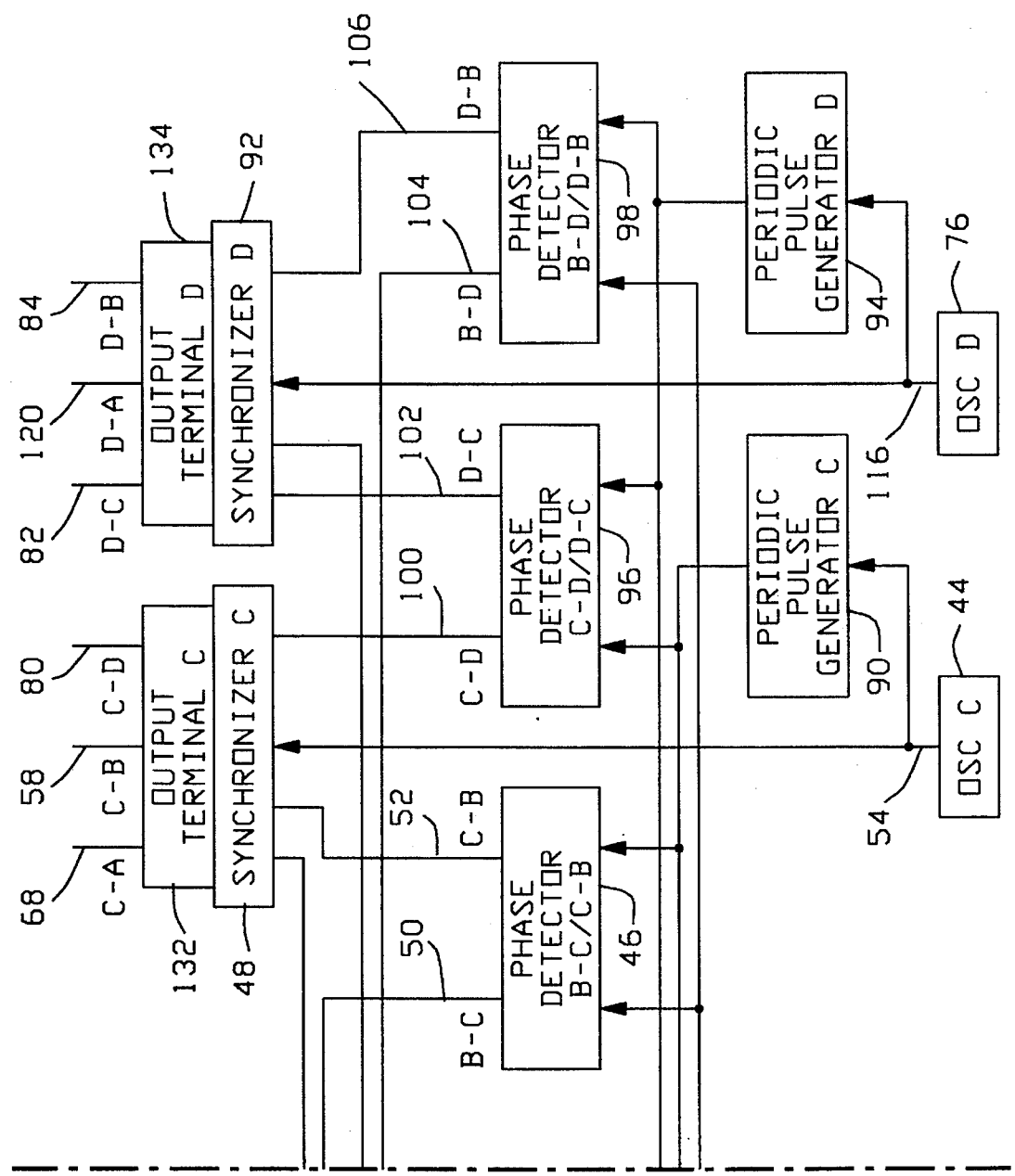

FIGS. 8A and 8B, when arranged as shown in FIG. 8 shows the capability of a four oscillator design to be expanded from eight Synchronized Clock Signals to twelve Synchronized Clock Signals. Not all possible oscillator pair combinations were used in the preferred embodiment. Four other synchronized clock signals could have theoretically been implemented: Synchronized Clock Signals A-D 118, D-A 120, B-C 56, and C-B 58. These were not implemented because the desired fault tolerance was obtained through the use of eight Synchronized Clock Signals. However, it should be noted that the other four combinations could be implemented with the addition of Phase Detector A-D/D-A 122 to monitor for phase deviations between the OSC A Clock Signal 14 and the OSC D Clock Signal 116, and Phase Detector B-C/C-B 46 to monitor for phase deviations between the OSC B Clock Signal 16 and the OSC C Clock Signal 54. Each Synchronizer A 24, B 26, C 48, and D 92 would also need to accommodate three Resynchronization Requests rather than two. This is due to the addition of Resynchronization Requests A-D 124, B-C 50, C-B 52, and D-A 126 connected to Synchronizers A, B, C, and D respectively.

Therefore, Phase Detector A-D/D-A 122 is used to monitor the phase deviation between the OSC A Clock Signal 14 and the OSC D Clock Signal 116. Resynchronization Requests A-D 124 and D-A 126 are sent to Synchronizers A 24 and D 92 respectively, so that the appropriate synchronizer can be notified that a resynchronization is required. Phase Detector B-C/C-B 46 is used to monitor the phase deviation between the OSC B Clock Signal 16 and the OSC C Clock Signal 54. Resynchronization Requests B-C 50 and C-B 52 are sent to Synchronizers B 26 and C 48 respectively. This configuration allows the greatest possible number of Synchronized Clock Signals to be generated through the use of four oscillators.

The result of the simultaneous synchronization of the four oscillators is that four sets of synchronized clock pairs will constantly be present at Output Terminals A 128, B 130, C 132, and D 134 of Synchronizers A 24, B 26, C 48, and D 92 respectively. The Output Terminals comprise circuitry to drive the Synchronized Clock Signals. These Output Terminals are present in each Synchronizer, although they are not shown in each diagram. Each clock pair consists of two Synchronized Clock Signals; i.e., the clock pair associated with OSC A 10 and OSC B 12 consists of Synchronized Clock Signal A-B 18 and Synchronized Clock Signal B-A 20. These two Synchronized Clock Signals have been synchronized with each other, and could be used to simultaneously clock two redundant circuit loads. If either OSC A or OSC B was to fail, a different clock pair consisting of two other Synchronized Clock Signals would be chosen to clock the circuit loads. Since multiple Synchronized Clock Signals are already available, a switch to an operational clock pair can be accomplished much more quickly and effectively than if an operational oscillator had to first be selected and subsequently synchronized. To perform a switch from a faulty clock pair to an operational clock pair, a means to select the desired Synchronized Clock Signals from the total number of Synchronized Clock Signals must be implemented.

Figure 9:
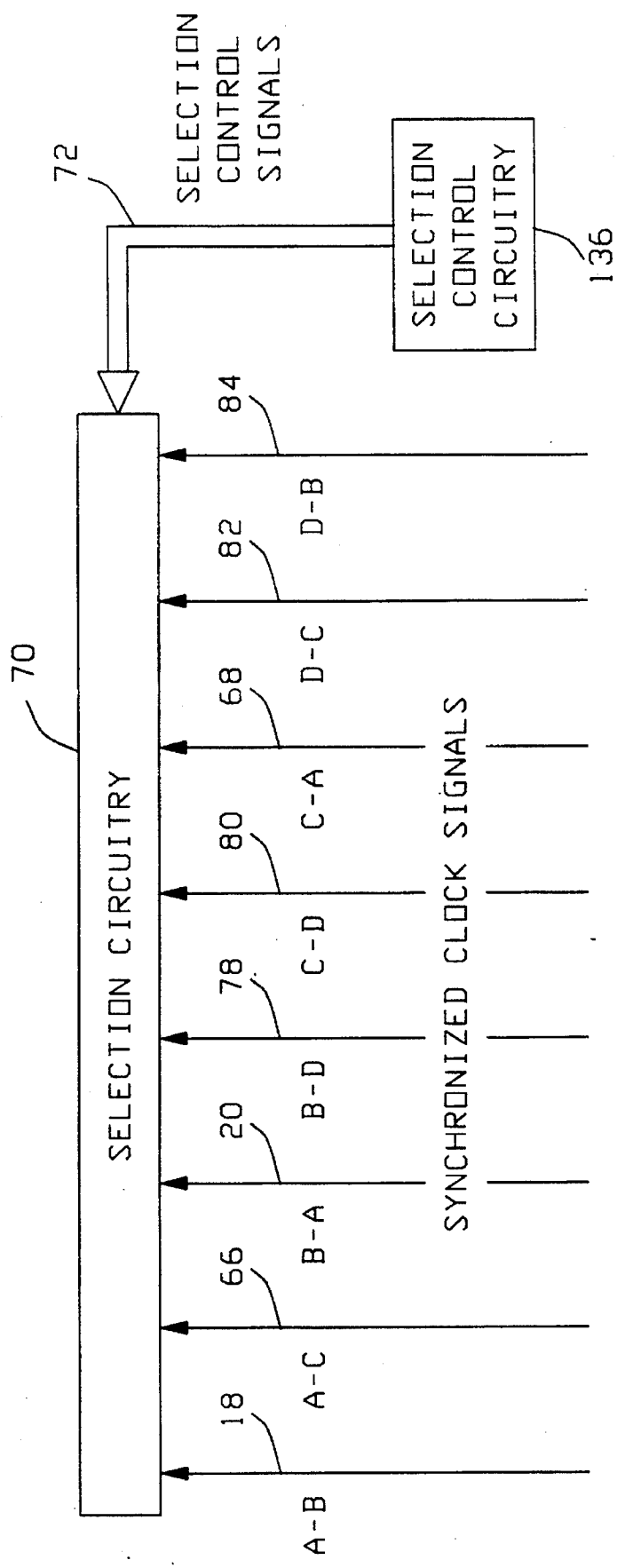
FIG. 9 shows the connection of the Synchronized Clock Signals to the Selection Circuitry and the Selection Control Circuitry.

FIG. 9 shows the connection of the Synchronized Clock Signals to the Selection Circuitry and the Selection Control Circuitry. Each of the Synchronized Clock Signals A-B 18, A-C 66, B-A 20, B-D 78, C-D 80, C-A 68, D-C 82, and D-B 84 are connected to Selection Circuitry 70. The Selection Control Circuitry 136 will select as many of the Synchronized Clock Signals as desired. In the preferred embodiment, only two Synchronized Clock Signals are selected at a time, since they are used to clock two redundant circuit loads. The Selection Control Circuitry 136 generates the Selection Control Signals 72 to communicate to the Selection Circuitry 70 which two Synchronized Clock Signals to select. The Selection Circuitry and the Selection Control Circuitry could consist of any type of selecting means known in the art, such as multiplexers, discrete Boolean logic, or software selecting methods.

Figure 10:
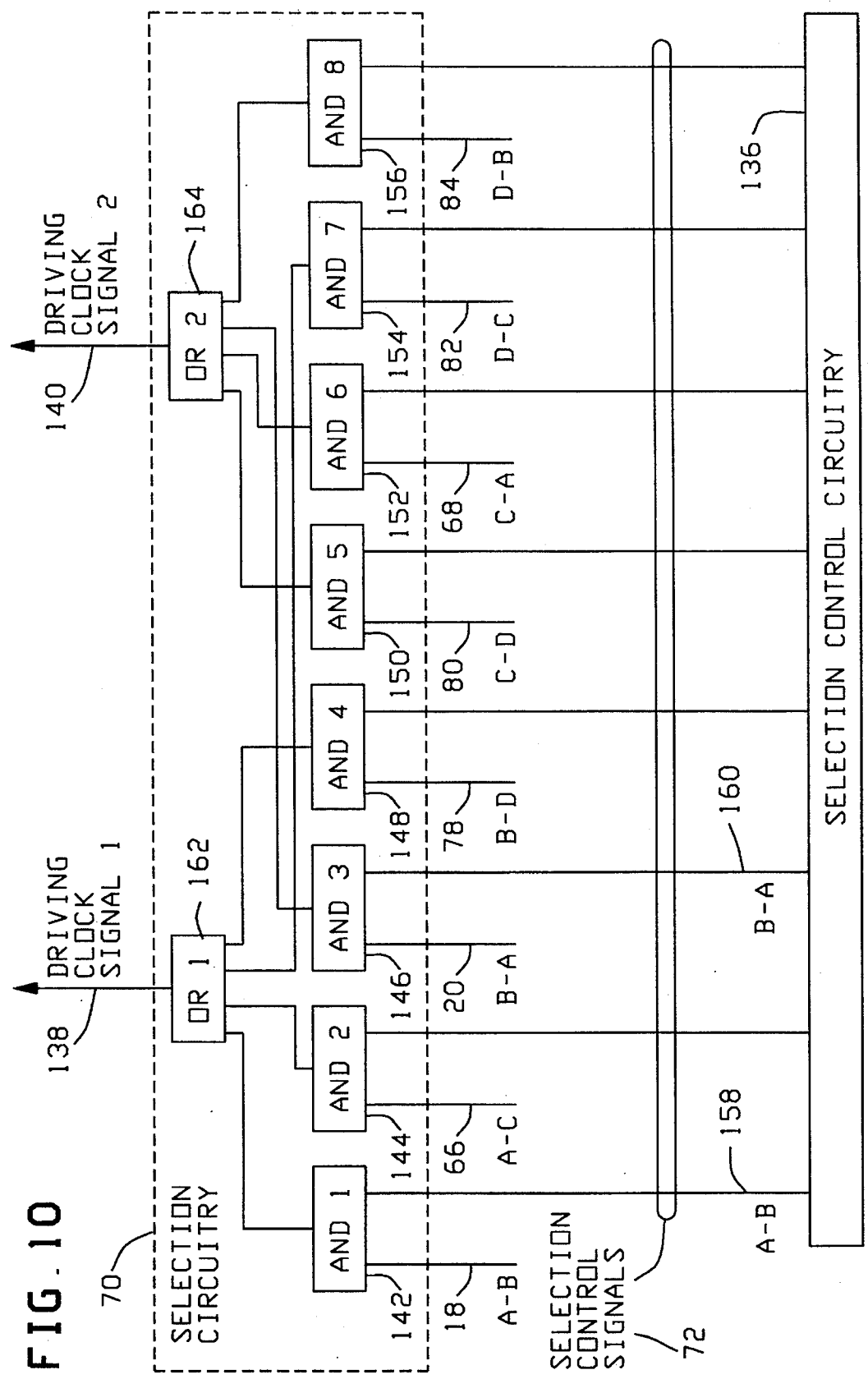
FIG. 10 is a diagram of the Selection Circuitry used in the preferred embodiment.

FIG. 10 is a diagram of the Selection Circuitry used in the preferred embodiment. A group of AND and OR gates is used to select two Synchronized Clock Signals as the Driving Clock Signals 1 138 and 2 140. The Selection Control Circuitry 136 will determine which of the four clock pairs (i.e., which of the two associated Synchronized Clock Signals) to choose as the Driving Clock Signals 1 and 2. When this determination has been made, high logic levels will be applied to the appropriate AND gates, labelled AND 1 142, AND 2 144, AND 3 146, AND 4 148, AND 5 150, AND 6 152, AND 7 154, and AND .8 156, to allow the corresponding Synchronized Clock Signals to pass through. These high logic levels are applied to the Selection Control Signals 72 from the Selection Control Circuitry 136. For instance, if the Selection Control Circuitry determines that it should select the clock pair consisting of Synchronized Clock Signal A-B 18 and Synchronized Clock Signal B-A 20, then Selection Control Signal A-B 158 and Selection Control Signal B-A 160 will be set to a high logic level. This in turn will enable Synchronized Clock Signal A-B to pass through AND 1 142 to OR 1 162, and Synchronized Clock Signal B-A to pass through AND 3 146 to OR 2 164. The remaining AND gates would not allow their corresponding Synchronized Clock Signals to pass through.

Each clock pair consists of two associated Synchronized Clock Signals. These two Synchronized Clock Signals in each clock pair are connected to separate OR gates through their corresponding AND gates. Synchronized Clock Signal A-B 18 is ultimately connected to OR 1 162, while its associated Synchronized Clock Signal B-A 20 is ultimately connected to OR 2 164. A similar pattern exists for Synchronized Clock Signals A-C 66 and C-A 68, B-D 78 and D-B 84, and C-D 80 and D-C 82. Therefore, Driving Clock Signal 1 138 and Driving Clock Signal 2 140 will consist of a synchronized clock pair which can simultaneously clock two separate circuit loads.

Figure 11:
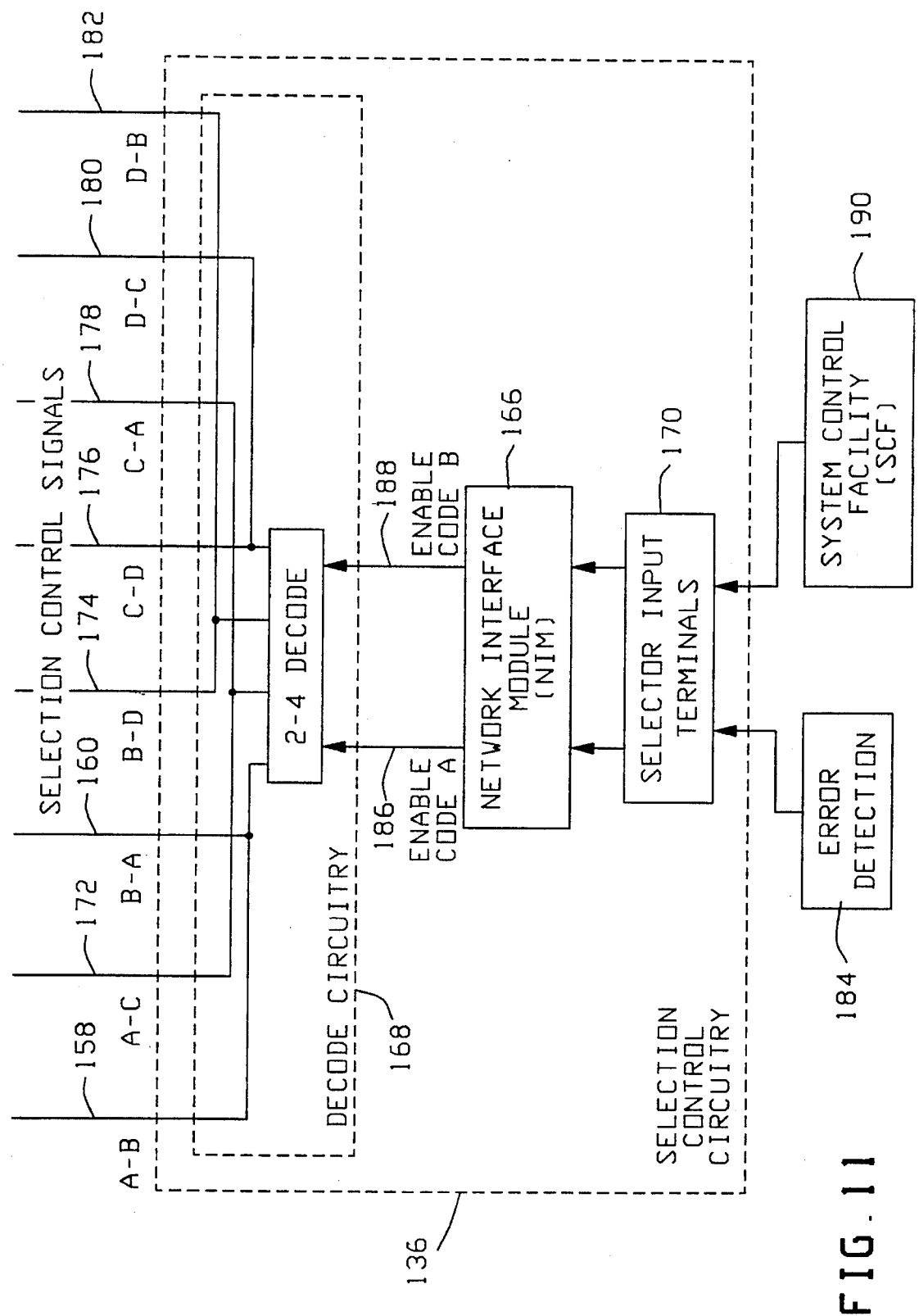
FIG. 11 is a diagram of the Selection Control Circuitry used in the preferred embodiment.

FIG. 11 is a diagram of the Selection Control Circuitry used in the preferred embodiment. This circuitry will determine which of the Synchronized Clock Signals will be selected by putting a high logic level at the desired Selection Control Signals. The Selection Control Circuitry 136 consists of a Network Interface Module (NIM) 166, Decode Circuitry 168, Selector Input Terminals 170, and Selection Control Signals A-B 158, A-C 172, B-A 160, B-D 174, C-D 176, C-A 178, D-C 180, and D-B 182 to connect to the Selection Circuitry 70.

The NIM 166 must determine which of the Selection Control Signals should be activated at a particular time. In the preferred embodiment, there are three circumstances which will cause the NIM to switch from one set of Synchronized Clock Signals to another set. First, oscillator or oscillator distribution errors are detected by the Error Detection 184 circuitry. When an error is detected which warrants an oscillator switch, a signal is sent to the NIM through the Selector Input Terminals 170.

The second circumstance that will cause the NIM to switch from one set of Synchronized Clock Signals to another deals with the application of power to the oscillators. The preferred embodiment utilizes two power domains, which comprises two separate and isolated voltage buses. OSC A 10 and OSC B 12 are powered by one voltage bus, and OSC C 44 and OSC D 76 are powered by the other voltage bus. It is unlikely that both of the voltage buses will be powered up at precisely the same time, and in some situations only one voltage bus may be desired. In these situations, one of the two oscillators in the power domain that has been powered up first will be selected to clock the circuit load in that power domain. When and if the other power domain is powered up, and the two oscillators in that power domain are operational, the NIM will switch to a set of Synchronized Clock Signals. The NIM will select a clock pair that is generated from oscillators in each of the two power domains. This allows at least one oscillator to continue operating upon loss of power to a power domain.

The clock pair is selected by a decode of the Enable Codes A 186 and B 188 which are driven by the NIM 166. The two Enable Codes are decoded by the Decode Circuitry 168 to select one of the four possible clock pairs as shown in the following table:

| Enable Code A | Enable Code B | Action |
| --- | --- | --- |
| 0 | 0 | Select A-B/B-A Clock Pair |
| 0 | 1 | Select A-C/C-A Clock Pair |
| 1 | 0 | Select B-D/D-B Clock Pair |
| 1 | 1 | Select C-D/D-C Clock Pair |

The A-B/B-A clock pair (Synchronized Clock Signal A-B 18 and Synchronized Clock Signal B-A 20) are the Synchronized Clock Signals derived from the OSC A Clock Signal 14 and the OSC B Clock Signal 16, which reside in one power domain. The C-D/D-C clock pair (Synchronized Clock Signal C-D 80 and Synchronized Clock Signal D-C 82) are the Synchronized Clock Signals derived from the OSC C Clock Signal 54 and the OSC D Clock Signal 116, which reside in the other power domain. Therefore, depending upon which power domain is powered up first, either the A-B/B-A clock pair or the C-D/D-C clock pair will be the default clock pair selected; however, in the preferred embodiment, only one of the Synchronized Clock Signals of each pair will actually be clocking the circuit load until the other power domain is powered up. For instance, if the A-B/B-A clock pair resides in the power domain that has been powered up, only Synchronized Clock Signal A-B 18 will clock the circuit loads although OSC A 10 and OSC B 12 are both operational and are being synchronized with one another. Although the preferred embodiment of the invention does not use both signals of the A-B/B-A clock pair or the C-D/D-C clock pair to clock the circuit loads in their respective power domains upon application of power, it could be performed. In the preferred embodiment, only one Synchronized Clock Signal was used upon application of power on the theory that the other power domain would be powered up immediately following the application of power to the first power domain. In either case, the NIM 166 must select an operational clock pair upon recognition that all power domains have powered up.

The NIM 166 will continuously monitor a status register to determine if both power domains are powered up, and therefore all oscillators are available. When all oscillators become available, the NIM will switch Enable Codes A 186 and B 188 from a 00 or 11 to a 01 or 10. This will switch from a clock pair which is derived from oscillators in the same power domain to a clock pair which is derived from oscillators in different power domains. This provides fault tolerance in the event that one of the power domains loses power, since the other oscillator could continue operating.

The third circumstance that will cause the NIM to switch from one set of Synchronized Clock Signals to another is a manual clock pair switch. If for any reason an operator wanted to switch from one clock pair to another, the System Control Facility (SCF) 190 gives the operator access to the NIM 166 in order to switch the Enable Codes A 186 and B 188. The SCF is an interface console in which an operator can access the status of the NIM, and can perform system manual functions such as a clock pair switch.

The NIM 166 therefore encodes the signals received from the Error Detection 184, the SCF 190, and its internal power initiation values, and sends these encoded Enable Code signals to the Decode Circuitry 168. The NIM 166 in the preferred embodiment is designed to select two Synchronized Clock Signals (one clock pair) at a time because it was predetermined which Synchronized Clock Signals would be paired to drive the dual recipient circuit loads. If more flexibility was desired in selecting the Synchronized Clock Signals, a 3–8 decoding circuit or similar decoding circuitry could be used so that each Synchronized Clock Signal could be independently selected.

Figure 12:
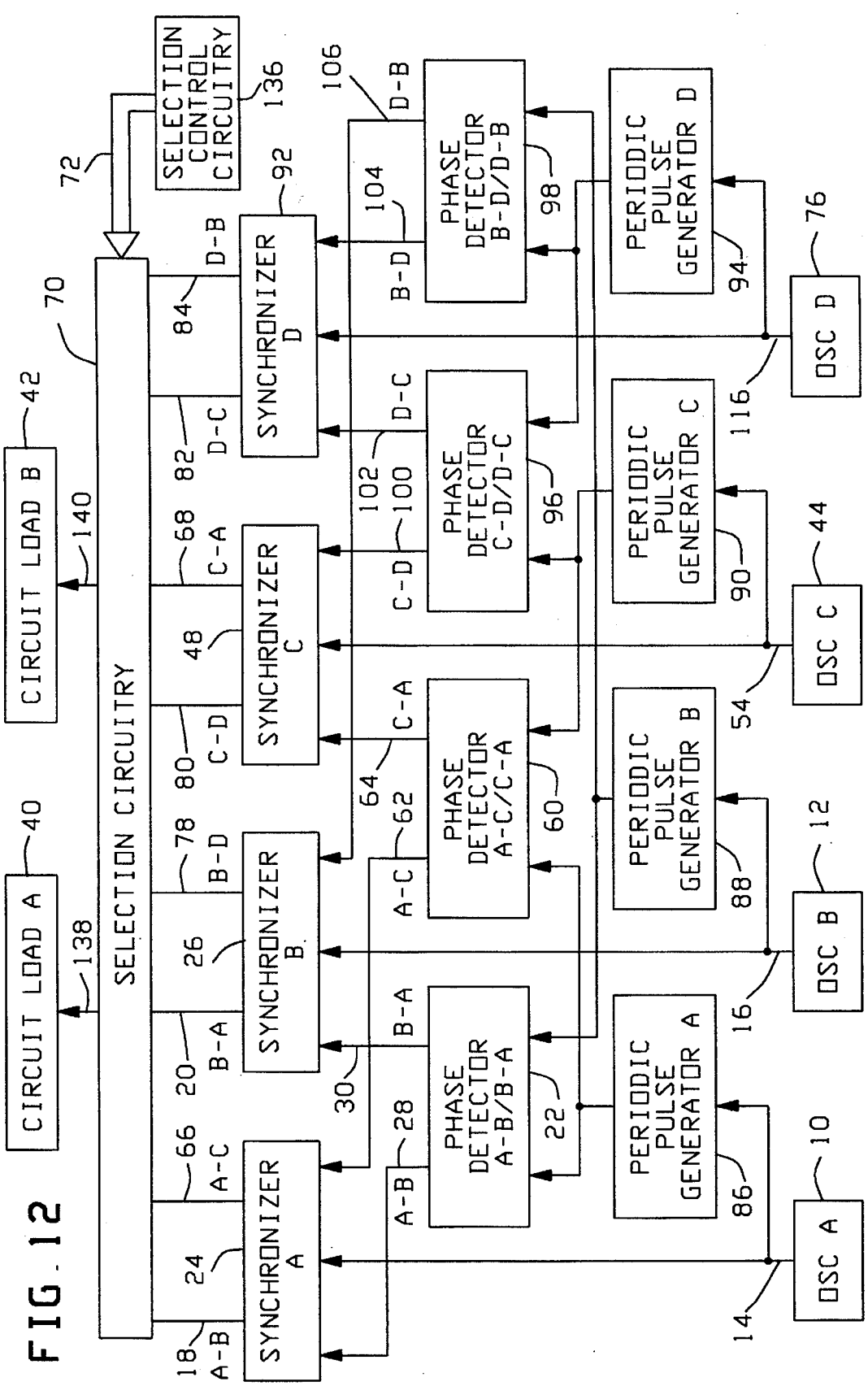
FIG. 12 is an overall block diagram of the invention as it was implemented in the preferred embodiment.

FIG. 12 is an overall block diagram of the invention as it was implemented in the preferred embodiment. Two circuit loads, labelled Circuit Load A 40 and Circuit Load B 42, are simultaneously clocked by two of the eight Synchronized Clock Signals. At the outputs of each of the Synchronizers A 24, B 26, C 48, and D 92 are the Synchronized Clock Signals which are all active, and all that is necessary to switch to new Synchronized Clock Signals is a control signal from the Selection Control Circuitry 136 to the Selection Circuitry 70. This provides for very fast switching to operational clock pairs where a clock pair has failed, which prevents loss of data or functionality at the Circuit Loads.

The foregoing description describes a redundant clock signal generator. The invention allows multiple clock signals, generated by multiple oscillators, to be synchronized in order to clock redundant circuit loads, and to provide fault tolerance in the event that an oscillator or its associated circuitry fails. Selection circuitry is also provided to select a certain number of the synchronized clock signals to be the driving clock signals to the clock receiving circuitry. The simultaneous synchronization and the ability to quickly select an available synchronized clock signal results in a redundant clock synchronization system that is valuable in systems requiring a high degree of reliability.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. For use in a digital system requiring a plurality of synchronized clock signals, a redundant clock signal generator, comprising:

a plurality of oscillators producing clock signals of substantially like frequency;

a plurality of digital phase detectors, a different one of said plurality of digital phase detectors coupled to a different combination of two clock signals, each said phase detector providing resynchronization request signals to indicate which, if any, of said two clock signals in its associated combination of said two clock signals is displaced from the other;

a plurality of digital synchronizers, a different one of said plurality of digital synchronizers coupled to an associated one of said plurality of oscillators to receive an associated one of said clock signals, and coupled to associated predetermined ones of said plurality of digital phase detectors to receive said resynchronization request signals, each of said digital synchronizers having circuitry to adjust the phase of said associated one of said clock signals upon receipt of said resynchronization request signals, thus synchronizing said associated one of said clock signals with selected one or more other clock signals; and output terminals on each one of said plurality of digital synchronizers to output a number of synchronized ones of said clock signals equal to the number of said clock signals to which said associated clock signal is to be synchronized.

2. A redundant clock signal generator as in claim 1, wherein less than the total possible number of combinations of two clock signals are chosen to be synchronized.

3. A redundant clock signal generator as in claim 1, further comprising:

selection circuitry coupled to each of the synchronized clock signals outputted from the aggregate of said synchronizers; and selection control circuitry coupled to said selection circuitry, whereby said selection control circuitry determines which of the plurality of synchronized clock signals outputted from the aggregate of said synchronizers are to be selected, and said selection circuitry selects a number of the synchronized clock signals according to the determination of said selection control circuitry.

4. A redundant clock signal generator as in claim 3, wherein said selection control circuitry further comprises:

selector input terminals to receive external control signals for receiving information as to which synchronized clock signal are to be selected;

encoding circuitry coupled to said selector input terminals to generate enable codes from the information received by said selector input terminals; and decoding circuitry coupled to said encoding circuitry to decode the enable codes into individual selection control signals to allow selection of any one of the possible synchronized clock signals.

5. A redundant clock signal generator as in claim 4, wherein said decoding circuitry decodes the external control signals into pairs of selection control signals, to allow selection of any pair of the synchronized clock signals.

6. A redundant clock signal generator as in claim 1, wherein multiple synchronized clock signals, equal to the total possible number of combinations of two clock signals, are simultaneously available at the output terminals of the aggregate of said synchronizers.

7. For use in a digital system requiring two synchronized clock signals, a redundant clock signal generator, comprising:

two oscillators producing clock signals of substantially like frequency;

a digital phase detector coupled to each of said two oscillators to monitor the phase difference of said clock signals, and to provide two resynchronization request signals to indicate which, if any, of said clock signals produced by said two oscillators is displaced from the other;

two digital synchronizers, each coupled to a different one of said two oscillators, and coupled to said digital phase detector to receive a different one of said two resynchronization request signals, each one of said digital synchronizers including circuitry to adjust the phase of said clock signal provided by said associated oscillator in response to said associated one of said two resynchronization request signals, causing synchronization of said associated clock signal with the other clock signal, and each one of said digital synchronizers having a terminal to provide a resulting synchronized clock signal, whereby the two said resulting synchronized clock signals have been synchronized with each other to thereby allow two redundant clock receiving circuits to be clocked substantially simultaneously.

8. For use in a digital system requiring a plurality of synchronized clock signals to be provided to clock receiving circuitry, a redundant clock signal generator, comprising:

a plurality of oscillator means for producing a plurality of clock signals of substantially like frequency;

phase detection means coupled to said plurality of oscillator means for detecting phase deviations between each possible predetermined combination of ones of said plurality of clock signals and generating resynchronization request signals upon detection of said phase deviations; and a plurality of synchronization means, each coupled to a different one of said plurality of oscillator means and coupled to said phase detection means, for producing a plurality of synchronized clock signals by adjusting the phase of the clock signal produced by said associated oscillator means upon receipt of said resynchronization request signals from said phase detection means.

9. A redundant clock signal generator as in claim 8, further including selection means, coupled to said plurality of synchronization means, for selecting one or more of the plurality of synchronized clock signals produced by said plurality of synchronization means to drive the clock receiving circuitry.

10. A redundant clock signal generator as in claim 9, further including selection control means coupled to said selection means, for determining which of the synchronized clock signals should be selected and issuing selection control signals to said selection means to specify the desired synchronized clock signals.

11. A redundant clock signal generator as in claim 10, wherein said selection means together with said selection control means select two synchronized clock signals at a time, and these two synchronized clock signals have been synchronized to each other.

12. A redundant clock signal generator, comprising:

first oscillator means for generating a first clock signal;

second oscillator means for generating a second clock signal having a frequency approximately equal to said first clock signal;

phase detection means coupled to said first oscillator means and coupled to said second oscillator means for detecting a phase deviation between said first clock signal and said second clock signal;

a first synchronization means coupled to said first oscillator means and coupled to said phase detection means for synchronizing said first clock signal, when said phase deviation is detected and for providing a first synchronized clock signal synchronized with said second clock signal for a first detected phase relationship:

a second synchronization means coupled to said second oscillator means and coupled to said phase detection means for synchronizing said second clock signal when said phase deviation is detected and for providing a second synchronized clock signal synchronized with said first clock signal for a second detected phase relationship.

13. A redundant clock signal generator, comprising:

a plurality of oscillators for generating a plurality of clock signals having approximately equal frequencies;

phase detection means coupled to said plurality of oscillators for detecting phase deviations between all possible predetermined combinations of ones of said plurality of clock signals;

a plurality of synchronization means, each coupled to a different one of said plurality of oscillators and coupled to said phase detection means for synchronizing each of said possible predetermined combinations of said plurality of clock signals for which a phase deviation is detected.

14. The clock signal generator of claim 13, wherein said plurality of synchronization means includes output means for providing one or more synchronized groups of clock signals.

15. The clock signal generator of claim 14, further comprising selection means coupled to said output means of said plurality of synchronization means for receiving said one or more synchronized groups of clock signals and for selecting one or more of said synchronized groups of clock signals.

16. The clock signal generator of claim 15, wherein said selection means includes means for selecting any one pair of said plurality of synchronized pairs of clock signals.

17. A redundant clock signal generator, comprising:

first oscillator means for generating a first clock signal;

second oscillator means for generating a second clock signal having a frequency approximately equal to said first clock signal;

third oscillator means for generating a third clock signal having a frequency approximately equal to said first clock signal;

phase detection means coupled to said first oscillator means, coupled to said second oscillator means, and coupled m said third oscillator means for detecting a first phase deviation between said first clock signal and said second clock signal, for detecting a second phase deviation between said first clock signal and said third clock signal, for detecting a third phase deviation between said second clock signal and said first clock signal, for detecting a fourth phase deviation between said second clock signal and said third clock signal, for detecting a fifth phase deviation between said third clock signal and said first clock signal, and for detecting a sixth phase deviation between said third clock signal and said second clock signal; and a first synchronization means coupled to said first oscillator means and coupled to said phase detection means for synchronizing said first clock signal with said second clock signal when said first phase deviation is detected, for providing a first synchronized clock signal which is said first clock signal synchronized to said second clock signal when said first phase deviation is detected, for synchronizing said first clock signal and said third clock signal when said second phase deviation is detected, for providing a second synchronized clock signal which is said first clock signal synchronized to said third clock signal when said second phase deviation is detected;

a second synchronization means coupled to said second oscillator means and coupled to said phase detection means for said synchronizing said second clock signal with said first clock signal when said third phase deviation is detected, for providing a third synchronized clock signal which is said second clock signal synchronized to said first clock signal when said third phase deviation is detected, for synchronizing said second clock signal and said third clock signal when said forth phase deviation is detected, for providing a fourth synchronized clock signal which is said second clock signal synchronized to said third clock signal when said fourth phase deviation is detected:

a third synchronization means coupled to said third oscillator means and coupled to said phase detection means for synchronizing said third clock signal with said first clock signal when said fifth phase deviation is detected, for providing a fifth synchronized clock signal which is said third clock signal synchronized to said first clock signal when said fifth phase deviation is detected, for synchronizing said third clock signal and said second clock signal when said sixth phase deviation is detected, for providing a sixth synchronized clock signal which is said third clock signal synchronized to said second clock signal when said sixth phase deviation is detected.

18. The clock signal generator of claim 17, wherein said synchronization means further includes means for outputting a first synchronized clock signal, a second synchronized clock signal, a third synchronized clock signal, a fourth synchronized clock signal, a fifth synchronized clock signal, and a sixth synchronized clock signal, wherein said first synchronized clock signal is said first clock signal synchronized with said second clock signal, said second synchronized clock signal is said first clock signal synchronized with said third clock signal, said third synchronized clock signal is said second clock signal synchronized with said first clock signal, said fourth synchronized clock signal is said second clock signal synchronized with said third clock signal, said fifth synchronized clock signal is said third clock signal synchronized with said first second clock signal, and said sixth synchronized clock signal is said third clock signal synchronized with said second clock signal.

* * * * *